March 17, 1964 R. M. ULRICH 3,125,360
FLUID CONDUIT COUPLER
Filed Oct. 20, 1958 2 Sheets-Sheet 1

Inventor:
Raymond M. Ulrich
By: Graf, Nieman & Burmeister
Attorneys

March 17, 1964 R. M. ULRICH 3,125,360
FLUID CONDUIT COUPLER

Filed Oct. 20, 1958 2 Sheets-Sheet 2

Inventor:
Raymond M. Ulrich
By: Graf, Nieman & Burmeister
Attorneys

United States Patent Office 3,125,360
Patented Mar. 17, 1964

3,125,360
FLUID CONDUIT COUPLER
Raymond M. Ulrich, Roanoke, Ill., assignor to Ulrich Foundation, Inc., Roanoke, Ill., a corporation of Delaware
Filed Oct. 20, 1958, Ser. No. 768,150
10 Claims. (Cl. 285—137)

The present invention relates to devices for interconnecting fluid conduits, and particularly to swivel couplers for use in hydraulic systems.

As hydraulic equipment becomes more complex, it has become more difficult to mount the necessary hydraulic conduits in the limited space available for this purpose. One device which will facilitate mounting a large number of hydraulic conduits is a manifold block which may be mounted to the support for the equipment and anchor a number of conduits which are connected to one or more hydarulic circuits.

A manifold block, however, increases the need for swivels since each conduit is now constrained to follow a common path, rather than the path most convenient for that particular conduit, thus requiring more turns in the conduit. Further, it is desirable to provide a means for connecting the conduits to the manifold block which requires little space along the block in order to take optimum advantage of the space savings afforded by manifold blocks. Also, the conduits should preferably be readily disconnectable from the manifold block for service of the equipment.

It is therefore an object of the present invention to provide a manifold block and swivel connector combination which optimizes the number of conduits which may be connected to a manifold block in a given space.

It is a further object ofthe present invention to provide a swivel hydraulic connector which may be readily disassembled for repair or to disconnect a hydraulic cable from a piece of equipment such as a manifold block.

It is a further object of the present invention to provide a swivel that is readily disassembled which may be used in the presence of dust and dirt without injury to the coupler.

These and further objects of the present invention will be readily apparent from a further reading of this disclosure, particularly when considered in the light of the drawings, in which.

Figure 1:
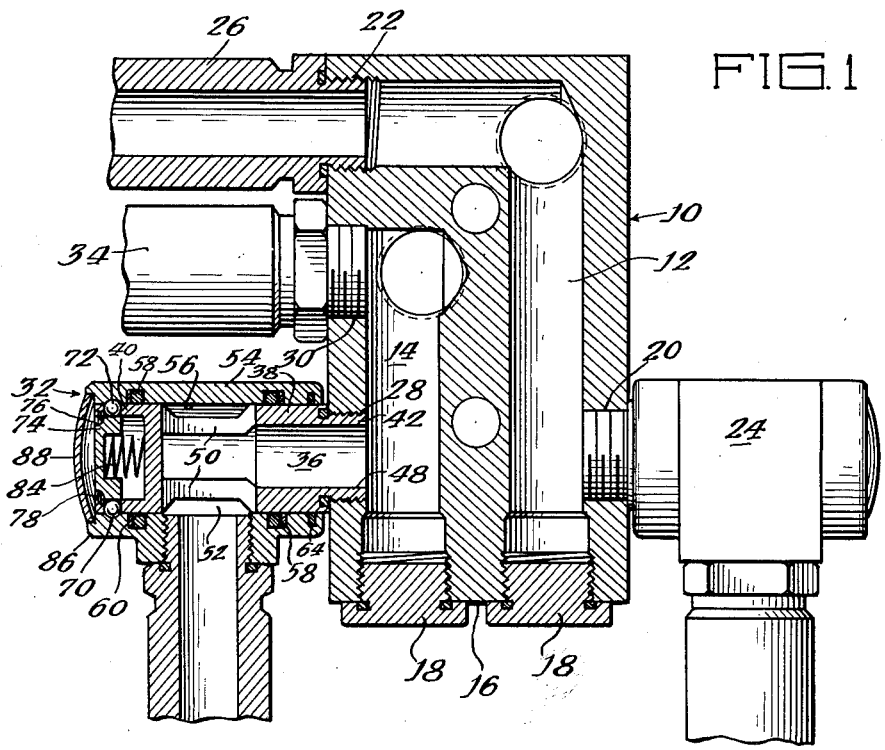
FIGURE 1 is a sectional view of a manifold block with a plurality of conduits connected to the block, including conduits connected through swivel couplers, according to the present invention.

FIGURE 1 illustrates a rectangular manifold block 10 with two hydraulic channels 12 and 14 extending therein from one side 16 of the block. The channels 12 and 14 are cylindrical, and the mouths of the channels are sealed with plugs 18 which threadedly engage the block. The channel 12 has two openings 20 and 22 located on opposite sides of the block, and a swivel coupler 24 is sealed within the opening 20 while a conduit or hose 26 is sealed within the opening 22. The channel 14 also has two openings 28 and 30 located on the same side of the manifold block 10 as the opening 22, and a swivel coupler 32, identical to the swivel coupler 24, and hose 34 are sealed to these openings 28 and 30, respectively. In FIGURE 1, all of the openings are threaded and the conduits and swivel couplers mate with the threads, although it is to be understood that seals may be provided by press fits and other means.

Figure 2:
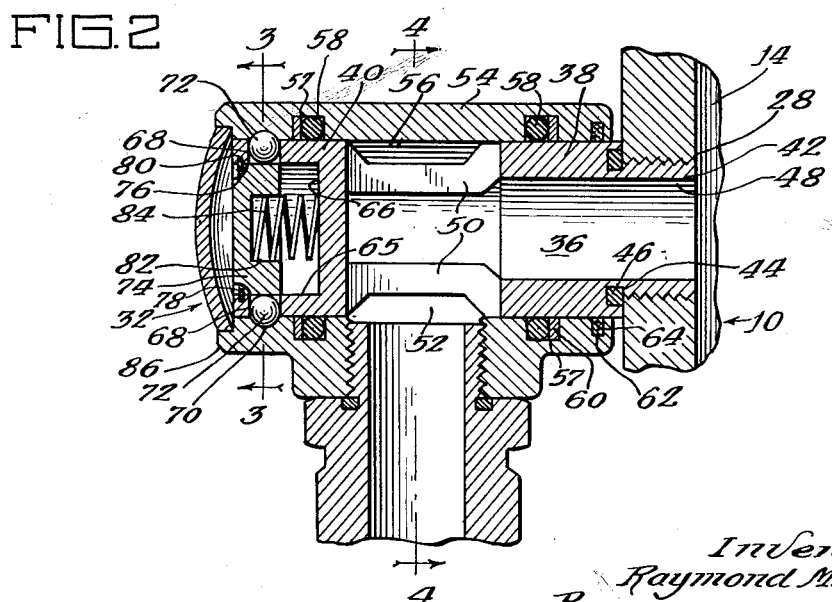
FIGURE 2 is an enlarged sectional view of the swivel coupler illustrated in FIGURE 1.
Figure 3:
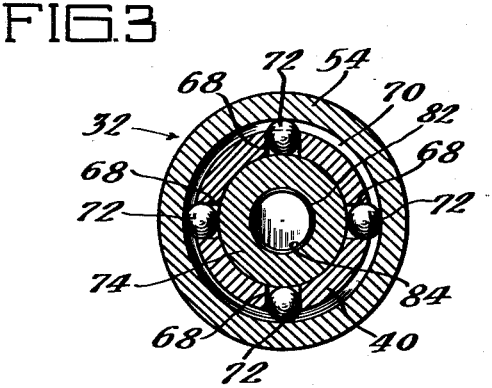
FIGURE 3 is a sectional view of the swivel coupler taken along the line 3—3 of FIGURE 2.
Figure 4:
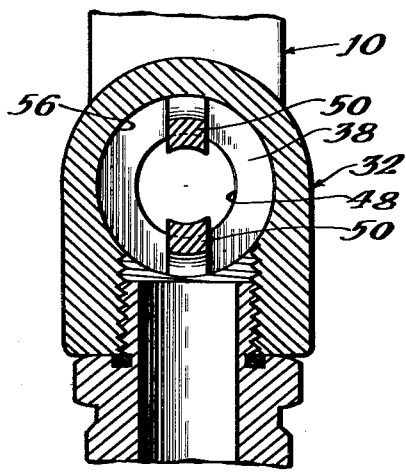
FIGURE 4 is a sectional view of the swivel coupler taken along the line 4—4 of FIGURE 2.

The details of the construction of the swivel couplers are best illustrated in FIGURES 2 through 4. These couplers have a member 36 which has two spaced cylindrical portions 38 and 40, and a threaded portion 42 of reduced diameter extending from the cylindrical portion 38 and mating with the threads of the opening 20 or 28 in the block 10. A groove 44 is provided about the portion 42 of reduced diameter, and a sealing ring 46 is disposed within the groove 44 and abuts the confronting wall of the block 10 to provide a seal. The cylindrical portion 38 and the restricted portion 42 heave an axial bore 48 extending therein and communicating with the channel 14 of the block 10. The two cylindrical portions 38 and 40 are interconnected by two spaced bars 50, thus forming an orifice 52 communicating with the bore 48.

A sleeve 54 with a cylindrical axial channel 56 fits rotatably about the member 36 and is provided with a coaxial groove 57 confronting each of the cylindrical portions 38 and 40 of the member 36. An O-ring 58 is disposed in each of the grooves 57, and a washer 60 is also disposed in each of the grooves between the O-ring and the adjacent end of the sleeve 54. The O-rings 58 are constructed of an elastomer, such as rubber, and provide an O-ring seal between the member 36 and the sleeve 54. In addition, the sleeve is provided with a groove 62 about its inner surface adjacent to its end confronting the cylindrical portion 38 of the member 36, and a dust seal 64 is disposed in the groove 62, such as a felt washer.

The cylindrical portion 40 of the member 36 is provided with a cylindrical recess 65 extending therein from the side opposite the bars 50. The recess 65 does not extend through the cylindrical portion, but terminates in a flat circular surface 66. At least one aperture 68 extends through the cylindrical portion 40 of the member 36 from the recess 65, and in one particular construction, there are four such equally spaced apertures. These apertures 68 confront a semi-circular coaxial groove 70 in the confronting surface of the sleeve 54. Each of the apertures 68 has a ball 72 disposed therein, and the balls extend into the groove 70. The diameter of the balls 72 is equal to the depth of the groove 70 plus the length of the aperture 68, so that the balls extend to the recess 65 but not therein when abutting the groove 70.

A cylindrical plug 74 with the diameter of the recess 65 is slidably disposed within the recess 65. The plug 74 has a beveled edge 76 opposite the flat surface 66, and a snap ring 78 is disposed within a coaxial slot 80 between the groove 70 and the end of the member 36 and abuts the beveled edge of the plug 74 to prevent its removal from the recess 65. The plug 74 also has an indentation 82 on its surface confronting the surface 66 of the recess 65, and a coil spring 84 abuts both the surface 66 and the indentation 82 to retain the plug 74 in contact with the snap ring 78. The sleeve 54 is also provided with an outwardly extending rim 86 on its end opposite the block 10, and a flexible dome-shaped cover 88 engages the rim 86 to prevent dust and dirt from entering the swivel coupler.

The swivel coupler may be readily disassembled for service or to disconnect a conduit from the block 10 or other device with which it is being employed. To disassemble the coupler, the cover 88 is removed from the rim 86, and the plug 74 is forced against the spring 84 toward the surface 66 of the recess 65. This aligns the beveled edge 76 of the plug 74 with the balls 72, and permits the balls 72 to roll inwardly from the sleeve 54 to disengage the groove 70 of the sleeve. Since only the engagement of the balls 72 with the groove 70 maintains axial alignment of the member 36 and sleeve 54, the sleeve 54 is then readily translated axially of the member 36 to disassemble the swivel coupler. It is also to be noted that the axial length of the cylindrical surface of the plug 74 abutting the recess 65 is approximately equal to the distance between the apertures 68 in the cylindrical portion 40 of the member 36 and the flat surface 66 of the recess 65, so that the balls 72 are limited in their radial movement by the beveled edge 76 of the plug 74. The diameter of the apertures 68 is also restricted to less than the diameter of the balls 72 in the portion immediately adjacent to the sleeve 54, so that the balls 72 cannot fall from the apertures 68.

When it is desired to reassemble the swivel coupler, it is only necessary to depress the plug 74 to permit the balls 72 radial inward movement and to slide the sleeve 54 over the member 36. When the apertures 68 become aligned with the groove 70 of the sleeve 54, the plug 74 is released, thus forcing the balls 72 into engagement with the groove 70 and completing the reassembly of the swivel coupler.

The O-rings 58 have cross section dimensions slightly greater than the depth of the groove 57 in the sleeve 54, so that they assume a slightly elliptical shape between the member 36 and the sleeve 54 in the absence of fluid pressure exerted upon them. Each washer 60 also fits relatively loosely between the member 36 and the sleeve 54 and between the O-ring 58 and the side of the groove 57. It is thus clear that pressure exerted from the interior of the member 36 forces the O-ring 58 against the washer 60 and the sleeve 54 and the member 36, thus forming a fluid seal. Since friction between the washer 60 and the sleeve 54 causes the washer to rotate with the sleeve when the sleeve is rotated relative to the member 36, the sole friction applied to the O-ring 58 is the contact with the member 36, thus resulting in a long life for the O-ring even when frequently rotated.

Figure 5:
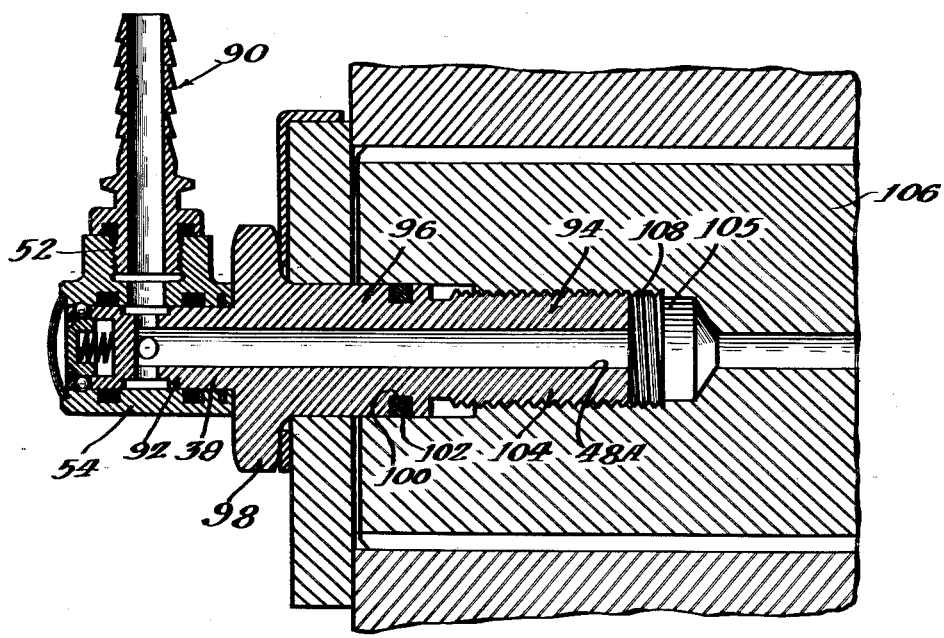
FIGURE 5 is a sectional view of a swivel coupler which constitutes another embodiment of the present invention.

FIGURE 5 illustrates a modified construction for a swivel coupler constructed according to the teachings of the present invention. The swivel coupler in FIGURE 5 has a sleeve which is essentially identical to the sleeve 54, and thus the sleeve and elements assembled therewith will not be further described, and the same reference numerals will be applied as in the first embodiment. A hose connector 90 is illustrated sealed within the opening 52 of the sleeve 54.

A member 92 is rotatably disposed within the sleeve 54, and the portions of the member 92 within the sleeve 54 are identical to the corresponding portions of the member 36, and have been designated by the same reference numerals. The member 92, however, has a structure 94 for mounting the swivel coupler to the wall of a piece of equipment in a manner similar to the threaded restricted cylindrical portion 42 of the member 36. The structure 94 has a portion 96 of larger diameter than the cylindrical portion 38 of the member 92, and a flange 98 extends outwardly therefrom between the portion 96 and the cylindrical portion 38 for the purpose of engaging a wrench, and hence is generally provided with a hexagonal cross section. The cylindrical portion 96 is provided with a coaxial groove 100 which contains an O-ring 102. The structure 94 has a threaded cylindrical portion 104 on the side of the portion 96 opposite the flange 98, and this portion 104 has a diameter less than the diameter of the portion 96. An axial bore 48A extends through the structure 94 and the cylindrical portion 38 and is equivalent to the bore 48 of the first embodiment.

The structure 94 is secured within a channel 105 of the equipment with which the swivel connector is to be used, designated 106. The channel 105 confronts the portion 96 of the structure 94 and engages the O-ring 102 to form a fluid seal. The channel 105 also has a threaded portion 108 which engages the threaded portion 104 of the structure 94. Since a wrench may be applied to the flange 98, the coupler may be secured within the channel 105, and there is no danger of injury to the swivel coupler by tightening the structure 94 within the channel 105.

Many modifications and improvements upon the structures specifically described will be apparent from the foregoing description. Further, many applications of the present invention in addition to those stated will become apparent, such as use of the invention for gases as well as liquids. It is therefore intended that the scope of the present invention be not limited to the foregoing disclosure, but rather only by the appended claims.

The invention claimed is:

1. A swivel fluid coupler comprising, in combination, a sleeve having a cylindrical channel extending therethrough and an opening extending through the sleeve adapted to receive a hollow tube for conducting fluid, said sleeve having a continuous groove in the surface of the channel thereof extending about the channel in a plane normal to the axis of the channel, a member having a first portion with a cylindrical outer surface, a second portion with a cylindrical outer surface coaxial with the outer surface of the first portion and spaced from the first portion, and a third portion disposed between the first and second portions, the member being rotatably disposed within the sleeve and the first and second portions rotatably abutting the surface of the channel and being sealed thereto against the passage of fluid, said member having an axial bore extending through the second and third portions and having a mouth remote from the first portion and an orifice extending through the third portion communicating with the bore and the opening of the sleeve, the second portion of the member being adapted to be mounted on a fluid conveying device with the member extending therefrom and the mouth of the bore of the member in fluid communication with the fluid carried by said device, whereby fluid may be conducted through the mouth and bore of the member, the orifice of the member, and the opening of the sleeve, the first portion of the member having a surface generally normal to the axis of the bore impervious to the passage of fluid and provided with a recess in said surface extending therein from the end of the member, said first portion having an aperture extending therethrough from the recess to the cylindrical outer surface thereof, said aperture being aligned with the groove of the sleeve, a locking member movably disposed in the aperture, and latch means disposed in the recess of the member for controlling the position of the locking member, resilient means acting between said normal surface and said latch means, removable means operatively disposed between the latch means and the first portion of the member to limit outward movement of said latch means, said latch means being movable between two positions in said recess, the first of said positions forcing the locking member outwardly from the aperture into the groove and the second position, wherein the resilient means is compressed, releasing the locking member for retraction from the groove, whereby the sleeve may be released from the member and slidably disengaged from the member by actuation of the control means for the locking member located within the recess at the end of the member, thus disconnecting the hollow tube from the fluid carrying device without removing the member from the fluid carrying device.

2. A swivel fluid coupler comprising the elements of claim 1 wherein the member is provided with a mounting structure extending from the cylindrical portion of the member having the bore, said mounting structure having a portion extending outwardly a greater distance than the sleeve and adapted to engage a wrench, and a channel extending therethrough and communicating with the bore.

3. A coupling device for a fluid system comprising a manifold block having a channel therein adapted to carry a fluid and a plurality of openings disposed in the block adjacent to each other and communicating with the channel, and a swivel coupler comprising the elements of claim 1 mounted in each of a plurality of adjacent openings of the manifold block, the second portion of the member of each coupler being sealed within an opening of the manifold block, and each of the members extending outwardly from the manifold block, whereby disconnecting one coupler from the manifold is accomplished by actuating the latch means for the locking member in the recess of that coupler and sliding the sleeve of that coupler from the member thereof without requiring the member of that coupler to be removed from the manifold.

4. A swivel fluid coupler comprising the elements of claim 1 wherein the member has a plurality of apertures extending through the cylindrical surface of the first portion thereof from the recess and a locking member in the form of a spherical ball having a diameter greater than the length of the aperture is disposed in each aperture, said apertures being located in a plane normal to the axis of the member and adjacent to the mouth of the recess, the latch means and removable means being totally disposed within the recess and the removable means comprising a second groove extending about the recess between the plane of the apertures and the mouth of the recess, and a snap ring disposed in the second groove of the recess forming a stop for translation of the latch means, the latch means being a plug disposed within the recess of the member having a peripheral surface slidably engaging the surface of the recess adjacent to each aperture, said plug having an axial indentation on the side thereof remote from the mouth of the recess, the resilient means being a spring disposed between the indentation and the recess of the member urging the plug away from the third portion of the member, the peripheral surface of the plug abutting the balls when the plug abuts the ring, the plug being movable from said ring to clear the apertures and release of the balls, whereby a force applied to the plug along the axis of the member against the tension of the spring releases the balls from the groove of the sleeve and permits the sleeve to be removed from the member.

5. A coupling device for fluid systems comprising a manifold block having a channel therein and a surface with a plurality of openings at one side of the channel adjacent to each other and communicating with the channel, and a swivel coupler comprising the elements of claim 4 sealed and mounted within each of a plurality of adjacent openings of the manifold block and extending therefrom parallel to each other, whereby any one of the couplers may be removed without the use of tools by applying a force against the plug of the coupler aligned with the axis of the member of the coupler to release the member from the sleeve, and sliding the sleeve from the member.

6. A swivel fluid coupler comprising the elements of claim 4, wherein the sleeve is provided with a first coaxial groove and a second coaxial groove with rectangular cross sections confronting the first portion and the second portion of the member respectively, in combination with a flat washer disposed in each of the grooves, and an O ring constructed of an elastomer disposed in each of the grooves between the washer and the orifice of the sleeve.

7. A swivel coupler comprising the elements of claim 4, wherein the plug is cylindrical and the surface of the plug opposite the recess is beveled about is periphery, and the axial length of the cylindrical surface of the plug approximately equals the axial length of the cylindrical surface of the recess between the apertures and the end of the recess opposite the mouth thereof.

8. A swivel coupler comprising the elements of claim 4, wherein the sleeve is provided with a circular outwardly extending rim from its end adjacent to the plug, and a resilient dome-shaped circular cover is disposed in engagement with the rim.

9. A swivel fluid coupler comprising the elements of claim 1, wherein the sleeve is provided with a circular outwardly extending rim from its end adjacent to the latch means, and a resilient dome-shaped circular cover is disposed in engagement with the rim.

10. A swivel fluid coupler comprising the elements of claim 1 wherein the member has a plurality of apertures extending through the cylindrical surface of the first portion thereof from the recess, and a locking member in the form of a spherical ball having a diameter greater than the length of the aperture is disposed in each aperture, said apertures being located in a plane normal to the axis of the member.

References Cited in the file of this patent

UNITED STATES PATENTS

| | | |
|---|---|---|
| 1,532,774 | Page | Apr. 7, 1925 |
| 1,635,144 | Stevens | July 5, 1927 |
| 1,730,377 | Northrup | Oct. 8, 1929 |
| 2,400,658 | Shepherd | May 21, 1946 |
| 2,412,287 | Phillips | Dec. 10, 1946 |
| 2,437,814 | Hallen | Mar. 16, 1948 |
| 2,480,662 | McKinzie | Aug. 30, 1949 |
| 2,521,127 | Price | Sept. 5, 1950 |
| 2,565,572 | Pangborn | Aug. 28, 1951 |
| 2,578,542 | Hanson | Dec. 11, 1951 |
| 2,579,845 | McWherter | Dec. 25, 1951 |
| 2,635,931 | May | Apr. 21, 1953 |
| 2,665,818 | Borges et al. | Jan. 12, 1954 |
| 2,705,177 | Waring | Mar. 29, 1955 |
| 2,729,417 | Maynard | Jan. 3, 1956 |
| 2,749,193 | Traub | June 5, 1956 |
| 2,860,893 | Clark | Nov. 18, 1958 |
| 2,872,217 | May | Feb. 3, 1959 |

FOREIGN PATENTS

| | | |
|---|---|---|
| 992,512 | France | July 11, 1951 |